(12) United States Patent
Jung et al.

(10) Patent No.: US 9,203,085 B2
(45) Date of Patent: Dec. 1, 2015

(54) ANODE ACTIVE MATERIAL FOR LITHIUM SECONDARY BATTERY AND LITHIUM SECONDARY BATTERY HAVING THE SAME

(75) Inventors: Dong-Sub Jung, Daejeon (KR); Hye-Min Ji, Gyeonggi-do (KR); Je-Young Kim, Daejeon (KR); Ki-Tae Kim, Daejeon (KR); Yong-Ju Lee, Daejeon (KR)

(73) Assignee: LG Chem, Ltd. (KR)

( * ) Notice: Subject to any disclaimer, the term of this patent is extended or adjusted under 35 U.S.C. 154(b) by 81 days.

(21) Appl. No.: 13/292,463

(22) Filed: Nov. 9, 2011

(65) Prior Publication Data

US 2012/0052388 A1 Mar. 1, 2012

Related U.S. Application Data

(63) Continuation of application No. PCT/KR2010/007980, filed on Nov. 12, 2010.

(30) Foreign Application Priority Data

Nov. 12, 2009 (KR) .................. 10-2009-0109241
Nov. 10, 2010 (KR) .................. 10-2010-0111343

(51) Int. Cl.
| | |
|---|---|
| H01M 10/052 | (2010.01) |
| H01M 4/134 | (2010.01) |
| H01M 4/587 | (2010.01) |
| H01M 4/133 | (2010.01) |
| H01M 4/38 | (2006.01) |
| C22C 1/10 | (2006.01) |
| H01M 4/36 | (2006.01) |
| H01M 4/62 | (2006.01) |
| H01M 4/02 | (2006.01) |

(52) U.S. Cl.
CPC ............. *H01M 4/386* (2013.01); *C22C 1/10* (2013.01); *H01M 4/364* (2013.01); *H01M 4/587* (2013.01); *H01M 4/133* (2013.01); *H01M 4/134* (2013.01); *H01M 4/625* (2013.01); *H01M 10/052* (2013.01); *H01M 2004/027* (2013.01)

(58) Field of Classification Search
CPC ... H01M 10/052; H01M 4/386; H01M 4/134; H01M 4/364; H01M 4/587; H01M 4/625; H01M 4/133
See application file for complete search history.

(56) References Cited

U.S. PATENT DOCUMENTS

| | | | |
|---|---|---|---|
| 2004/0142242 A1 | 7/2004 | Kawase et al. | |
| 2006/0008706 A1* | 1/2006 | Yamaguchi et al. | 429/313 |
| 2006/0102472 A1 | 5/2006 | Bito et al. | |
| 2007/0077490 A1* | 4/2007 | Kim et al. | 429/218.1 |
| 2007/0128517 A1* | 6/2007 | Christensen et al. | 429/218.1 |
| 2008/0090152 A1* | 4/2008 | Kosuzu et al. | 429/231.95 |
| 2009/0111020 A1 | 4/2009 | Yamaguchi et al. | |
| 2012/0231330 A1* | 9/2012 | Fujii et al. | 429/200 |

FOREIGN PATENT DOCUMENTS

| | | | | |
|---|---|---|---|---|
| CN | 1492524 A | | 4/2004 | |
| CN | 101322266 A | | 12/2008 | |
| CN | 101527358 A | | 9/2009 | |
| EP | 1643572 A1 | * | 9/2005 | .............. H01M 4/38 |
| EP | 1643572 A1 | | 4/2006 | |
| JP | 2006-049266 | * | 2/2006 | ............ H01M 10/40 |
| JP | 2006-164960 A | | 6/2006 | |
| KR | 2006-0074807 A | | 7/2006 | |
| KR | 2006-0094633 A | | 8/2006 | |
| KR | 1020050015801 | * | 8/2006 | .............. H01M 4/02 |
| KR | 2009-0078591 A | | 7/2009 | |

OTHER PUBLICATIONS

Obrovac, et al., "Alloy Design for Lithium-Ion Battery Anodes," Journal of The Electrochemical Society, vol. 154, No. 9, pp. A849-855 (2007).
Lee, et al., "Rapidly solidified Ti-Si alloys/carbon composites as anode for Li-ion batteries," Electrochimica Acta, vol. 52, pp. 1523-1526. May 11, 2006.

* cited by examiner

*Primary Examiner* — Barbara Gilliam
*Assistant Examiner* — Angela Martin
(74) *Attorney, Agent, or Firm* — Lerner, David, Littenberg, Krumholz & Mentlik, LLP

(57) ABSTRACT

An anode active material for a lithium secondary battery includes a silicon alloy that includes silicon and at least one kind of metal other than silicon, the silicon alloy allowing alloying with lithium. A volume of an inactive region in the silicon alloy, which is not reacted with lithium, is 50 to 75% of the entire volume of an active material. The anode active material has a large capacity in comparison to carbon-based anode active materials, and also ensures small volume expansion and high capacity retention ratio after charging/discharging, resulting in excellent cycle characteristics.

8 Claims, No Drawings

ANODE ACTIVE MATERIAL FOR LITHIUM SECONDARY BATTERY AND LITHIUM SECONDARY BATTERY HAVING THE SAME

CROSS-REFERENCE TO RELATED APPLICATION

This application is a continuation of International Application No. PCT/KR2010/007980 filed on Nov. 12, 2010, which claims priority under 35 USC 119(a) to Korean Patent Application No. 10-2009-0109241 filed in the Republic of Korea on Nov. 12, 2009 and Korean Patent Application No. 10-2010-0111343 filed on Nov. 10, 2010, the entire contents of which are incorporated herein by reference.

BACKGROUND OF THE INVENTION

1. Field of the Invention

The present invention relates to an anode active material for a lithium secondary battery and a lithium secondary battery having the same. More particularly, the present invention relates to an anode active material for a lithium secondary battery, which has large capacity, excellent cycle characteristic and low volume expansion, and a lithium secondary battery having the same.

2. Description of the Related Art

Recently, lithium secondary batteries are attracting attention as batteries having high energy density and a long cycle life. Generally, a lithium secondary battery includes an anode made of carbon material or lithium metal alloy, a cathode made of lithium metal oxide, and an electrolyte made by dissolving a lithium salt in an organic solvent.

Initially, lithium metal was used for the anode active material for the anode of a lithium secondary battery. However, due to lithium having a problem of low reversibility and low safety, generally carbon materials are used as an anode active material of a lithium secondary battery. The carbon material compared with lithium has low capacity, but is advantageous in that it has low volume change, excellent reversibility and low price.

However, as the use of lithium secondary batteries are increasing, so does the demand for high-capacity lithium secondary batteries. Accordingly, there is a demand for a high-capacity anode active material that may substitute the carbon material having low capacity. In order to meet the demand, attempts were made to use metals, for example Si and Sn, that have a higher charge/discharge capacity than the carbonaceous materials and that allow electrochemical alloying with lithium.

However, when Si or Sn are used as the anode active material, they have the tendency to cause great changes in volume expansion. Such great volume expansion may cause the creation of cracks or pulverization. Thus, when charging/discharging cycles are repeated, the metal-based anode active material shows a sudden deterioration of capacity and a shorter cycle life.

SUMMARY OF THE INVENTION

Therefore, it is an object of the present invention to provide an anode active material for a lithium secondary battery, which has a large capacity in comparison to a carbon-based anode active material, and also ensures small volume expansion and excellent cycle characteristics after charging/discharging; and a lithium secondary battery having the same.

In order to achieve the objects, the present invention provides an anode active material for a lithium secondary battery, which includes a silicon alloy that includes silicon and at least one kind of metal other than silicon, the silicon alloy allowing alloying with lithium, wherein a volume of an inactive region in the silicon alloy, which is not reacted with lithium, is 50 to 75% of the entire volume of an active material.

In the present invention, the silicon alloy may be an alloy including silicon and at least one element selected from the group consisting of Sn, Zr, Mn, Ni, Fe, Ca, Ce, La, Cr, Al, Co, Sb, Bi, As, Ge, Pb, Zn, Cd, In, Ti, and Ga.

In more detail, the silicon alloy according to the present invention may be expressed by the following chemistry figure 1.

$$Si_xA_yB_z \qquad \text{Chemistry Figure 1}$$

In the chemistry figure 1, A and B are independently Sn, Zr, Mn, Ni, Fe, Ca, Ce, La, Cr, Al, Co, Sb, Bi, As, Ge, Pb, Zn, Cd, In, Ti, or Ga, A and B are different from each other, and x, y, and z are atom % in which x+y+z=100, 60≤x<100, 0<y<30, 0<z<30.

Selectively, the anode active material according to the present invention may further include carbon material that may be used as an anode active material in the art. For example, natural graphite, artificial graphite, meso-carbon microbeads (MCMB), carbon fiber, and carbon black, or their mixtures may be used as the carbon material.

In addition, the carbon material preferably has a specific surface area of 10 m²/g or less, and the carbon material preferably has an average diameter of 5 to 100 μm.

Also, a mixture ratio by weight between the silicon alloy and the carbon material is preferably silicon alloy:carbon material=20:80 to 80:20.

In order to accomplish the above objects, the present invention also provides a method for making an anode active material for a lithium secondary battery, which includes (S1) melting silicon and at least one kind of metal element other than silicon in an inert circumstance; (S2) rapidly solidifying the melt solution to make powder; and (S3) pulverizing the powder to make silicon alloy powder with a predetermined average diameter.

The method according to the present invention may further include the step of mixing the silicon alloy powder with carbon material.

The anode active material of the present invention may be applied to an anode for lithium secondary batteries in a common way in the art, or used for making a lithium secondary battery.

Effects of the Invention

The anode active material according to the present invention has a large capacity in comparison to carbon-based anode active materials, and also ensures small volume expansion and high capacity retention ratio after charging/discharging, resulting in excellent cycle characteristics.

DESCRIPTION OF THE PREFERRED EMBODIMENT

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An anode active material according to the present invention includes a silicon alloy that includes silicon and at least one kind of metal other than silicon, the silicon alloy allowing alloying with lithium. Also, a volume of an inactive region in the silicon alloy not reacted with lithium, is 50 to 75% of the entire volume of an active material.

As mentioned above, the anode active material containing silicon may be easily pulverized due to cracks caused by the change of volume during the charging/discharging process, resulting in serious deterioration of capacity and shortened cycle life in accordance with charging/discharging cycles.

However, in the case the silicon alloy is used as the anode active material, one anode active material particle may be classified into an active phase region (a silicon phase) reacting with lithium and an inactive phase region (a phase in which silicon and a metal element other than silicon exist together, or a phase constituted with only metals other than silicon) not reacting with lithium.

The inventors of the present invention found that, in a case where silicon and at least one metal other than silicon are alloyed, capacity is not deteriorated, volume expansion is controlled, and cycle characteristics are excellent, when a volume of the inactive region in the silicon alloy is 50 to 75% of the entire volume of the silicon alloy. If the volume ratio of the inactive phase is less than 50%, the volume expansion ratio is very great. If the volume ratio is greater than 75%, the capacity of active material is deteriorated.

In the anode active material of the present invention, any element may be mixed with silicon to make an alloy without limitation, if the element may be used for making an anode active material as a silicon alloy in the art. For example, Sn, Zr, Mn, Ni, Fe, Ca, Ce, La, Cr, Al, Co, Sb, Bi, As, Ge, Pb, Zn, Cd, In, Ti, and Ga may be used solely or in combination, but not limitedly.

In the present invention, when a silicon alloy is used, the degree of inactive phase varies depending on the kind of mixed metal other than silicon, and thus in principle the amount of metal added is not specially limited.

In the anode active material of the present invention, the silicon alloy more preferably includes silicon and at least two kinds of metal other than silicon. The silicon alloy according to the present invention may be expressed by the following chemistry figure 1.

$$Si_x A_y B_z \qquad \text{Chemistry Figure 1}$$

In the chemistry figure 1, A and B are independently Sn, Zr, Mn, Ni, Fe, Ca, Ce, La, Cr, Al, Co, Sb, Bi, As, Ge, Pb, Zn, Cd, In, Ti, or Ga, A and B are different from each other, and x, y, and z are atom % in which $x+y+z=100$, $60 \leq x < 100$, $0 < y < 30$, $0 < z < 30$.

The silicon alloy according to the present invention has various degrees of inactive phase in accordance with the kind of mixed metal other than silicon; therefore, in principle, the amount of metal added cannot be defined in a lump as above. It should be understood by those of ordinary skill in the art that the ranges of x, y, and z are just examples in order to illustrate all the possible ranges of the various metal elements, on the assumption that the volume ratio of the inactive phase in the silicon alloy of the chemistry figure 1 satisfies the condition of 50% to 75%.

Also preferably, by using the silicon alloy having a specific volume ratio of the inactive phase, the inventors of the present invention improved capacity retention performance and thickness expansion control performance in comparison to conventional anode active materials containing carbon material and silicon alloy. However, the inventors found that, when the silicon alloy having a specific volume ratio of inactive phase is mixed with carbon material, the capacity retention performance and the thickness expansion control performance are further improved.

Any carbon material may be used as the anode active material of the present invention without any limitation, if the carbon material may be used as an anode active material in the art. For example, natural graphite, artificial graphite, meso-carbon microbeads (MCMB), carbon fiber, and carbon black, or their mixtures may be used as the anode active material of the present invention, but not limitedly.

In addition, the carbon material preferably has a specific surface area of 10 m²/g, more preferably 2 m²/g to 5 m²/g. If the specific surface area of the carbon material is greater than 10 m²/g, an initial efficiency may be deteriorated.

Also, the carbon material preferably has a particle diameter of 5 to 100 μm, more preferably 5 to 40 μm. If the particle diameter of the carbon material is less than 5 μm, the initial efficiency of the anode may be deteriorated due to the fine powder of the carbon material. If the particle diameter is greater than 100 μm, the productivity is deteriorated when coating the anode composite material, and scratches may increase on the electrode.

In the anode active material of the present invention, a mixture ratio by weight of the silicon alloy and the carbon material may be silicon alloy:carbon material=20:80 to 80:20, more preferably 40:60 to 60:40. When the carbon material is included in the range of 20% to 80%, the capacity retention ratio and the thickness expansion control performance may be more excellent.

An example of the method for making the anode active material according to the present invention is described below. However, the method described below is just one embodiment for illustrating the present invention, and the present invention is not limited thereto.

First, silicon and at least one metal element other than silicon are melted in an inert circumstance (S1).

In the method according to the present invention, any alloy element can be used for the silicon alloy if it can be used for making an anode active material. For example, at least two elements selected from the group consisting of Sn, Zr, Mn, Ni, Fe, Ca, Ce, La, Cr, Al, Co, Sb, Bi, As, Ge, Pb, Zn, Cd, In, Ti, and Ga may be used together, but not limitedly.

When the raw materials are melted, they are preferably melted in an inert circumstance in order to prevent impurities from being included therein.

Then, the melt solution is made into powder by means of rapid solidification (S2).

If the metal melt solution is rapidly solidified, many nucleuses are deposited, and thus silicon or silicon alloy may be obtained in a powder form. The rapid solidification may use any method commonly used in the art, for example gas atomization, roll quenching, rotated electrode, and so on. Among them, gas atomization is preferred.

Also, the obtained powder is pulverized to make silicon alloy with a predetermined average diameter (S3).

The powder obtained by the rapid solidification is made into anode active material powder with a demanded predetermined average diameter through an additional pulverizing process such as ball milling. An average diameter available for the anode active material is preferably 0.5 μm to 50 μm.

In the method for making an anode active material according to the present invention, the obtained silicon alloy powder may be mixed with carbon material, selectively.

Any carbon material may be mixed without any limitation if it can be used as an anode active material in the art. For example, natural graphite, artificial graphite, meso-carbon microbeads (MCMB), carbon fiber, and carbon black may be used solely or in mixture, but not limitedly.

A mixture ratio by weight of the silicon alloy and the carbon material may be silicon alloy:carbon material=20:80 to 80:20, more preferably 40:60 to 60:40.

The anode active material according to the present invention as prepared above may be used for making an anode in accordance with a method commonly used in the art. Also, a cathode according to the present invention may also be made in a common method in the art, similarly to the anode material. For example, the electrode active material of the present invention may be mixed with a binder and a solvent, and a conductive material and a dispersing agent if necessary, and then stirred to make a slurry, which is then applied to a current collector and compressed to make an electrode.

The binder may use various kinds of binder polymers such as vinylidenefluoride-hexafluoropropylene copolymer (PVDF-co-HFP), polyvinylidenefluoride, polyacrylonitrile, polymethylmethacrylate, and so on.

The cathode active material is preferably a lithium-containing transition metal oxide, for example any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or their mixtures. The lithium-containing transition metal oxide may be coated with metal such as Al or metal oxide. Also, sulfide, selenide and halide may be also used in addition to the lithium-containing transition metal oxide.

If the electrode is made, a lithium secondary battery including the cathode, the anode, the separator interposed between the cathode and the anode, and an electrolyte may be produced.

In the electrolyte used in the present invention, a lithium salt useable for the electrolyte may use any one commonly used in the electrolyte for lithium secondary batteries, with no limitation. For example, the lithium may have any anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte used in the present invention, an organic solvent included in the electrolyte may use any one commonly used in the electrolyte for lithium secondary batteries. Representative examples of the organic solvent are propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, divinylene carbonate, sulforane, γ-buryolactone, propylene sulfite, and tetrahydrofuran, or their mixtures. In particular, among the above carbonate-based organic solvents, ethylene carbonate and propylene carbonate that are cyclic carbonate are high-viscosity organic solvents, which have high dielectric constant and thus easily dissociates lithium salts in the electrolyte. Also, if low-viscosity and low-dielectric linear carbonate such as dimethyl carbonate and diethyl carbonate is mixed at a suitable ratio with the above cyclic carbonate, an electrolyte with high electric conductivity may be made and used more preferably.

Selectively, the electrolyte stored according to the present invention may further include an additive such as an overcharge inhibitor, which is included in a common electrolyte.

In addition, the separator may use a common porous polymer film conventionally used as a separator, for example porous polymer films made of ethylene homopolymer, propylene homopolymer, ethylene/butene copolymer, ethylene/hexene copolymer, and ethylene/methacrylate copolymer, solely or in lamination. In other cases, a common porous non-woven fabric, for example a non-woven fabric made of high-melting glass fiber, polyethylene terephthalate fiber, and so on, may be used, but not limitedly.

A battery case used in the present invention may use any one commonly used in the art, and there is no special limitation on the appearance according to the use of the battery. For example, the battery case may have a cylindrical shape using a can, a rectangular shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLE 1

<Preparation of Anode Active Material>

Metal was mixed by weight as shown in the table 2 below, and melted under an argon circumstance by high-frequency heating to make an alloy melt. The alloy melt was quenched by means of gas atomization using an argon gas with a pressure of 80 kg/cm$^2$, thereby making alloy powder with an average diameter of about 100 μm. At this time, the quenching rate was 1×10$^5$ K/sec.

The obtained alloy powder was ball-milled at 1,000 rpm for 15 hours to make silicon alloy powder.

<Preparation of Secondary Battery>

The obtained anode active material powder was mixed with acetylene black serving as a conductive material and polyvinylidene fluoride (PVdF) serving as a binder at a weight ratio of 93:2:5, and then mixed with N-methyl-2-pyrrolidone (NMP) serving as a solvent to make anode slurry. The obtained electrode slurry was applied to one surface of a copper current collector, dried at about 130° C. for 2 hours, and then made into an anode with a size of 1.4875 cm$^2$.

Ethylene carbonate (EC) and diethyl carbonate (DEC) were mixed at a volume ratio of 1:2, and then LiPF$_6$ was added to the nonaqueous electrolyte solvent to make 1M LiPF$_6$ nonaqueous electrolyte solution.

A lithium metal foil was used as a cathode. A polyolefin separator was interposed between the cathode and the anode, and then the electrolyte solution was injected therein to make a coin-type half battery.

EXPERIMENTAL EXAMPLE 1

Measurement of Volume Ratio of Inactive Phase

The volume ratio of the inactive phase is not easily measured with a direct method, and thus it was measured and calculated according to the following steps.

(1) Measurement of Density of Silicon Alloy

Pycnometer (AccuPyc 1340, Micromeritics Instrument Corp. USZ) was used as the equipment for measuring a density of a solid.

(2) Weight Ratio of Active Phase (Silicon Phase) (B)

$$B = \frac{capacity\_of\_silicon\_alloy}{3580} \times 100 \quad \text{Equation 1}$$

(3) Weight Ratio of Inactive Phase (C)

$$C = 100 - B \quad \text{Equation 2}$$

(4) The density of the active phase (silicon phase) is assumed as 2.33.

(5) Calculation of Density of Inactive Phase (D)

$$D = \frac{\text{density\_of\_active\_phase(silicon\_phase)} \times \text{weight\_ratio\_of\_inactive\_phase} \times \text{density\_of\_silicon\_alloy}}{100 \times \text{density\_of\_active\_phase(silicon\_phase)} - \text{weight\_ratio\_of\_active\_phase(silicon\_phase)} \times \text{density\_of\_silicon\_alloy}} \quad \text{Equation 3}$$

(6) Volume of Active Phase and Inactive Phase (E, F)

Here, the term "volume" means volumes of the active phase and the inactive phase, on the assumption that the weight of the silicon alloy is 100.

$$E = \frac{\text{weight\_of\_silicon\_phase}}{\text{density\_of\_silicon\_phase}} \quad \text{Equation 4}$$

$$F = \frac{\text{weight\_of\_inactive\_phase}}{\text{density\_of\_inactive\_phase}} \quad \text{Equation 5}$$

(7) Volume Ratio of Inactive Phase (X)

$$X = \frac{F}{F + E} \times 100 \quad \text{Equation 6}$$

If the values measured or calculated in accordance with the equations 1 to 6 are arranged, the following table 1 is obtained. In the table 1, the term "volume" means a volume of each phase when the weight of the silicon alloy is 100.

TABLE 1

|  | Density | Weight ratio | Volume | Volume ratio |
|---|---|---|---|---|
| Silicon alloy | A | 100 | — | — |
| Active phase (silicon phase) | 2.33 | B | E | — |
| Inactive phase | D | C | F | X |

EXPERIMENTAL EXAMPLE 2

Charge/Discharge Characteristics of Batteries

The batteries made according to the examples and the comparative examples were used for evaluating charge/discharge characteristics.

In detail, in the charging process, the batteries were charged by a constant current with a current density of 0.1 C up to 5 mV in a CC mode and then kept at 5 mV in a CV mode, and then the charging process ended if the current density reached 0.005 C. In the discharging process, the batteries were completely discharged with a current density of 0.1 C to 1V in a CC mode. The charging/discharging processes were repeated 100 times with the same conditions. Table. 2 shows evaluation results of the measured charge/discharge characteristics and volume ratios of the inactive phase.

In the table 2, the initial efficiency represents a first discharge capacity in comparison to a first charge capacity, the capacity retention ratio represents a ratio of $50^{th}$ discharge capacity in comparison to the first discharge capacity, and the thickness expansion ratio represents a ratio of the electrode thickness at the $50^{th}$ charge state in comparison to the electrode thickness before the charge/discharge process is initiated.

TABLE 2

|  | Anode active material (by weight) | $1^{st}$ discharge capacity (mAh/g) | Initial efficiency (%) | Capacity retention ratio (%) | Volume ratio of inactive phase (%) | Thickness expansion ratio (%) |
|---|---|---|---|---|---|---|
| Example 1 | SiCo (62/38) | 950 | 85.4 | 94 | 56 | 100 |
| Example 2 | SiTi (68/32) | 800 | 85.0 | 95 | 66 | 70 |
| Comparative example 1 | SiCo (67/33) | 1350 | 86.5 | 65 | 43 | 250 |
| Comparative example 2 | SiTi (60/40) | 500 | 83.1 | 90 | 77.5 | 50 |

As seen from the table 2, different from the examples 1 and 2 in which the volume ratio of the inactive phase is within the range of the present invention, it was found that the comparative example 1 exhibits a low capacity retention ratio and a very great thickness expansion ratio, and the comparative example 2 exhibits a low discharge capacity and thus not suitable as a battery.

EXAMPLES 3 TO 5 AND COMPARATIVE EXAMPLES 3 to 5

Silicon alloy powder and batteries were prepared in the same way as the example 1, except that metal was mixed at an atom % shown in the following table 3.

For the prepared batteries, volume ratio of inactive phase and charge/discharge characteristics were evaluated in the same way as the above experimental example 1, except that the charging/discharging processes were performed 100 times, the initial efficiency represents a first discharge capacity in comparison to a first charge capacity, the capacity retention ratio represents a ratio of $100^{th}$ discharge capacity in comparison to the first discharge capacity, and the thickness expansion ratio represents a ratio of the electrode thickness at the $100^{th}$ charge state in comparison to the electrode thickness before the charge/discharge process is initiated. The evaluation results are shown in the table 3.

TABLE 3

|  | Silicon alloy (atom %) | Volume ratio of inactive phase (%) | 1st discharge capacity (mAh/g) | Initial efficiency (%) | Capacity retention ratio (%) | Thickness expansion ratio (%) |
|---|---|---|---|---|---|---|
| Example 3 | SiNiTi (76/3/21) | 59 | 930 | 85.7 | 94 | 90 |
| Example 4 | SiNiTi (72/10/8) | 56 | 950 | 85.5 | 94 | 100 |
| Example 5 | SiMnCr (75/19/6) | 65 | 790 | 84.8 | 95 | 70 |
| Comparative example 3 | SiCo (81/19) | 43 | 1350 | 86.5 | 65 | 250 |
| Comparative example 4 | SiNiTi (83/3/14) | 45 | 1250 | 86.3 | 68 | 230 |
| Comparative example 5 | SiTi (72/28) | 77.5 | 500 | 83.1 | 90 | 50 |

As seen from the table 3, different from the examples 3 to 5 in which the volume ratio of the inactive phase is within the range of the present invention, it was found that the comparative examples 3 and 4 exhibits a low capacity retention ratio and a very great thickness expansion ratio. Also, it was found that the comparative example 5 exhibits a low discharge capacity and thus not suitable as a battery.

EXAMPLES 6 AND 7 AND COMPARATIVE EXAMPLES 6 AND 7

Metal was mixed by atom % as shown in the table 4 below, and melted under an argon circumstance by high-frequency heating to make an alloy melt. The alloy melt was quenched by means of gas atomization using an argon gas with a pressure of 80 kg/cm², thereby making alloy powder with an average diameter of about 100 μm. At this time, the quenching rate was 1×10⁵ K/sec. The obtained alloy powder was ball-milled at 1,000 rpm for 15 hours to make silicon alloy powder. The obtained silicon alloy powder was mixed with artificial graphite at a weight ratio of 50:50 to make an anode active material.

Also, a battery was made in the same way as the example 1 by using the obtained anode active material.

For the obtained batteries, the volume ratio of inactive phase and the charge/discharge characteristics were evaluated in the same way as the above experimental example. The evaluation results are shown in the table 4.

However, it was found that the comparative example 6 still exhibits a low capacity retention ratio and a very great thickness expansion ratio, and the comparative example 7 exhibits a low discharge capacity and thus not suitable as a battery.

What is claimed is:

1. An anode active material for a lithium secondary battery, comprising a silicon alloy that comprises silicon and at least one kind of metal other than silicon, the silicon alloy allowing alloying with lithium,
   wherein the silicon alloy has an active phase region reacting with lithium, which is a silicon phase, and an inactive phase region not reacting with lithium, which is a phase constituted with silicon and a metal other than silicon, or only the metal other than silicon,
   wherein a volume of the inactive phase region in the silicon alloy not reacted with lithium, is 50 to 75% of the entire volume of the silicon alloy, and
   wherein the silicon alloy is expressed by the following Chemical Formula 1:

$$Si_xA_yB_z \quad \text{Chemical Formula 1}$$

where A and B are independently Sn, Zr, Mn, Ni, Fe, Ca, Ce, La, Cr, Al, Co, Sb, Bi, As, Ge, Pb, Zn, Cd, In, Ti, or Ga, A and B are different from each other, and x, y, and z are atom % in which x+y+z=100, 60≤x<100, 0<y<30, 0<z<30.

2. The anode active material for a lithium secondary battery according to claim 1,

TABLE 4

|  | Silicon alloy (atom %) | Silicon alloy capacity | Volume ratio of inactive phase (%) | Ratio of silicon alloy/carbon material | 1st discharge capacity (mAh/g) | Initial efficiency (%) | Capacity retention ratio (%) | Thickness expansion ratio (%) |
|---|---|---|---|---|---|---|---|---|
| Example 6 | SiNiTi (76/3/21) | 930 | 59 | 50/50 | 660 | 90 | 96 | 50 |
| Example 7 | SiNiTi (72/10/8) | 950 | 56 | 50/50 | 675 | 89 | 95 | 55 |
| Comparative example 6 | SiNiTi (83/3/14) | 1250 | 45 | 50/50 | 810 | 86 | 69 | 140 |
| Comparative example 7 | SiTi (72/28) | 500 | 77.5 | 50/50 | 430 | 85 | 90 | 40 |

Looking at table 4, the examples and the comparative examples where carbon material (artificial graphite) is mixed, show that the initial efficiency, the capacity retention ratio, and the thickness expansion ratio of the examples 6 and 7 and the comparative examples 6 and 7 were further improved in comparison to the table 3.

wherein the anode active material further comprises a carbon material.

3. The anode active material for a lithium secondary battery according to claim 2,
   wherein the carbon material comprises any one selected from the group consisting of natural graphite, artificial graphite, meso-carbon microbeads (MCMB), carbon fiber, carbon black, and their mixtures.

4. The anode active material for a lithium secondary battery according to claim 2,
wherein the carbon material has a specific surface area of 10 m$^2$/g or less.

5. The anode active material for a lithium secondary battery according to claim 2,
wherein the carbon material has an average diameter of 5 to 100 μm.

6. The anode active material for a lithium secondary battery according to claim 2,
wherein a mixture ratio by weight between the silicon alloy to the carbon material is 20:80 to 80:20.

7. An anode for a lithium secondary battery comprising a current collector and an anode active material layer formed on at least one surface of the current collector and containing anode active material,
wherein the anode active material is defined in claim 1.

8. A lithium secondary battery, comprising:
a cathode;
an anode; and
a separator interposed between the cathode and the anode,
wherein the anode is defined in claim 7.

* * * * *